(12) United States Patent
Onoda

(10) Patent No.: US 6,433,941 B1
(45) Date of Patent: Aug. 13, 2002

(54) IMAGE READING APPARATUS AND IMAGE FORMING APPARATUS

(75) Inventor: Masaaki Onoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/587,343

(22) Filed: Jun. 5, 2000

(30) Foreign Application Priority Data

Jun. 18, 1999 (JP) .............................. 11-173158

(51) Int. Cl.[7] .................. G02B 27/02; G03G 15/00
(52) U.S. Cl. ......................... 359/806; 399/377
(58) Field of Search ............... 359/806, 807; 399/377; 358/474

(56) References Cited

U.S. PATENT DOCUMENTS 6,027,109 A    2/2000  Wade, et al. ............... 271/3.14
6,233,064 B1 * 5/2001  Griffen ........................ 358/474
6,316,766 B1 * 11/2001 Han ............................. 250/234

* cited by examiner

*Primary Examiner*—Georgia Epps
*Assistant Examiner*—Saeed H Seyrafi
(74) *Attorney, Agent, or Firm*—Fitzpatrick, Cella, Harper & Scinto

(57) ABSTRACT

The present invention relates to an image reading apparatus which has an original supporting surface on which a sheet original is placed, reading means for reading an image of the sheet original placed on the original supporting surface, and an abutting portion which is provided on the original supporting surface and against which an end portion of the sheet original abuts, and the autting portion has a positioning portion for positioning the end portion of the sheet original so that when the original supporting surface is brought into an inclined state with respect to a horizontal, the sheet original may not float up relative to the original supporting surface.

13 Claims, 8 Drawing Sheets

IMAGE READING APPARATUS AND IMAGE FORMING APPARATUS

BACKGROUND OF THE INVENTION

1. Field of the Invention

This invention relates to an image reading apparatus for causing reflected light or transmitted light obtained by applying light to an original to be imaged on a line-shaped photoelectric conversion element (hereinafter referred to as the image sensor) to thereby read an image on the original, and is applied, for example, to an image forming apparatus or the like for effecting image formation with respect to the read image.

2. Related Background Art

Heretofore, reflected light or transmitted light obtained by applying light to an original on a copier or an image reading apparatus such as an image scanner has been imaged on an image sensor or a photosensitive body by the use of a lens or the like to thereby read an image.

A method whereby the image reading apparatus (hereinafter referred to as the image scanner) reads an original will hereinafter be described with reference to FIGS. 3 and 4 of the accompanying drawings.

FIG. 3 is a schematic view of the image scanner, and FIG. 4 is a cross-sectional view taken along the arrow A of FIG. 3.

It is to be understood that the widthwise direction of an optical scanning unit U as image reading means is X direction, the lengthwise direction of the optical scanning unit U is Y direction, and a direction forming right angles with X and Y directions is Z direction. In FIGS. 3 and 4, arrows indicating the directions are shown.

In FIGS. 3 and 4, a sheet original P is placed on the original supporting surface of an original glass table 10 as the light transmitting member of the image scanner 50 with its original reading surface facing the original glass table 10 side. The sheet original P is irradiated by the light source 1 of the optical scanning unit U, and the reflected light thereof is imaged on an image sensor 3 through a Selfoc lens 2 (trademark, hereinafter referred to as SLA) to thereby read an image corresponding to one line of the sheet original P.

The optical scanning unit U is caused to scan in X direction along the original glass table 10 to thereby read the whole image of the sheet original P (U to U').

The optical scanning unit U is comprised of an optical unit 7 comprising the light source 1, SLA 2 and the image sensor 3, and a scanning unit 6. The scanning unit 6 biases the optical unit 7 toward the original glass table 10 (in Z direction) by biasing means 5.

The scanning unit 6 is engaged with a driving rail 4 supported on the apparatus, and is driven along the original glass table (original mount glass) 10. When the driving rail 4 is at one end portion of the widthwise direction of the scanning unit 6, a sliding portion 8 is provided at the other end of the widthwise direction of the scanning unit 6, and slides on a rail portion 31 on a bottom cover 30 (in the figures, the rail portion 31 and the bottom cover 30 are shown as the same member, but may be discrete members).

On the other hand, when as shown in FIG. 5 of the accompanying drawings, the driving rail 4 is in the substantially central portion of the scanning unit 6, the sliding portion 8 as shown in FIG. 4 may not be provided. Also, in the constructions shown in FIGS. 4 and 5, a leaf spring is used as the biasing means 5, but a coil spring or the like can also be used to obtain a similar effect.

The original glass table 10 of the image scanner 50 may be stuck on an upper cover 20 by the use of a both-surface tape (not shown) or the like (see FIGS. 4 and 5), or may be held on the bottom cover 30, as shown in FIG. 6 of the accompanying drawings.

In the method shown in FIG. 6, the upper cover 20 is not provided, but an abutting member 21 against which the end portion of the sheet original P abuts is stuck on the original glass table 10 held on the bottom cover 30 by means of a both-surface tape or the like to thereby take a countermeasure for the getting-into (passing-through) of the sheet original P.

The optical unit 7 has a projected portion 9 abutting against the original glass table 10 outside the reading area of the image sensor 3 in order that the positioning of the original glass table 10 and the optical unit 7 may be done accurately and the two may not directly abut against each other.

The optical unit 7 is always biased toward the original glass table 10 by the biasing means 5 and therefore, by making the dimensions of the projected portion 9 accurate, the positioning of the original glass table 10 and the optical unit 7 can be done accurately.

Further, because of a construction in which the optical unit 7 is biased toward the original glass table 10, it is not necessary to install the original glass table 10 substantially in parallel, i.e., horizontally, to the plane in which the image scanner 50 is installed. That is, even if the original glass table 10 is installed substantially vertically to the plane in which the image scanner 50 is installed, an image can be read without any problem.

FIGS. 7 and 8 of the accompanying drawings show schematic views in which the original glass table 10 is installed substantially vertically to the plane in which the image scanner 50 is installed. FIG. 7 is a schematic view illustrating the vertically placed state of the image scanner 50, and FIG. 8 is a view taken along the arrow A' in FIG. 7.

When the image scanner 50 is vertically placed as described above, the fore of the apparatus is supported by a vertically placing member 51 and the protruding portion 22 of the exterior package is used for the supporting of the rear of the apparatus. It is possible to change the shape of the protruding portion 22 to thereby vertically place the image scanner 50 in a state inclined with respect to the horizontal within the range of angle of $\theta \leq 90°$.

However, in the case of the prior art as described above, the following problems have arisen.

When as shown in FIG. 9A of the accompanying drawings, the sheet original P is disposed on the vertically placed image scanner 50, the lower end portion of the sheet original P is sometimes not supported in contact and the sheet original P cannot be disposed easily.

It is because the sheet original P is not well placed on an abutting surface 23a (or 21a) on which the lower end portion of the sheet original P abuts against an edge portion 23 as the abutting portion of the upper cover 20 holding the original glass table 10 thereon (or the stuck abutting member 21), and as shown in FIG. 9B of the accompanying drawings, the sheet original P deviates and slips down from the abutting surface.

It has also happened that the lateral end portion of the sheet original P when the image scanner 50 is vertically placed does not abut against the abutting surface and the sheet original P is turned over.

SUMMARY OF THE INVENTION

The present invention has been made in order to solve the above-noted problems peculiar to the prior art and the object thereof is to provide an image reading apparatus and an image forming apparatus in which the disposition of a sheet original when vertically placed is made easy.

To achieve the above object, an image reading apparatus according to the present invention comprises:

an original supporting surface on which a sheet original is placed;

reading means for reading an image of the sheet original placed on the original supporting surface; and an abutting portion which is provided on the original supporting surface and against which an end portion of the sheet original abuts;

wherein the abutting portion has a positioning portion for positioning the end portion of the sheet original so that when the original supporting surface is brought into an inclined state with respect to a horizontal, the sheet original may not float up relative to the original supporting surface.

Also, an image reading apparatus according to the present invention comprises:

an original supporting surface on which a sheet original is placed;

reading means or reading an image of the sheet original placed on the original supporting surface; and an abutting portion against which an end portion of the sheet original placed on the original supporting surface abuts;

wherein the abutting portion has a positioning portion for positioning the end portion of the sheet original so that when the original supporting surface is brought into an inclined state with respect to a horizontal, the end portion of the sheet original placed on the original supporting surface may not deviate from the abutting portion and the sheet original may not slip down.

Also, an image reading apparatus according to the present invention is an image reading apparatus comprises:

an original supporting surface on which a sheet original is placed in a horizontally placed state of a main body of the apparatus; and image reading means for reading the image of the sheet original placed on the original supporting surface; and an abutting member against which an end portion of the sheet original abuts and is positioned so that in the vertically placed state of the main body of the apparatus, the sheet original may be held relative to the original supporting surface.

DESCRIPTION OF THE PREFERRED EMBODIMENT

Figure 1A:
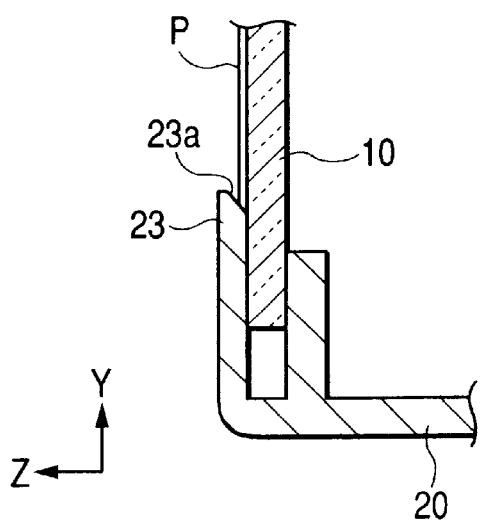
FIGS. 1A and 1B are partial cross-sectional views showing the edge portion of an original glass table when vertically placed according to an embodiment of the present invention.

A preferred embodiment of this invention will hereinafter be described in detail by way of example with reference to the drawings. However, the dimensions, materials, shapes, relative positions, etc. of constituent parts described in this embodiment, unless specifically described, are not intended to restrict the scope of this invention thereto.

The whole of the image scanner 50 (image reading apparatus) has been described with respect to the prior art and therefore, herein the same reference characters are given and the description thereof is omitted, and portions of the present invention will be described in detail.

Figure 1B:
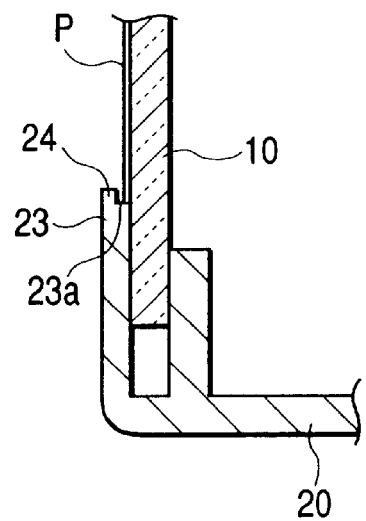
Figure 6:
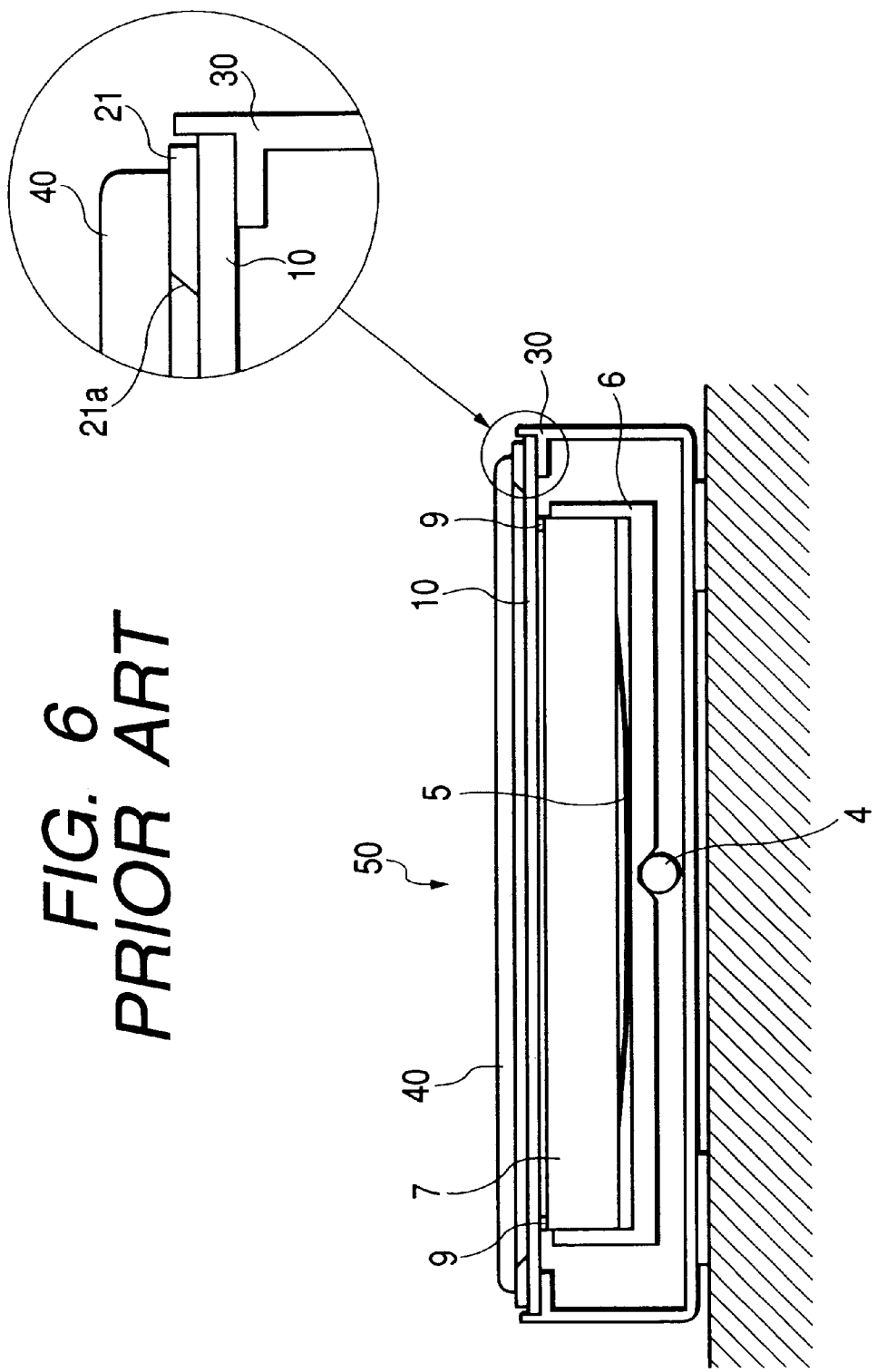
FIG. 6 schematically shows the construction of an image scanner according to the prior art.
Figure 7:
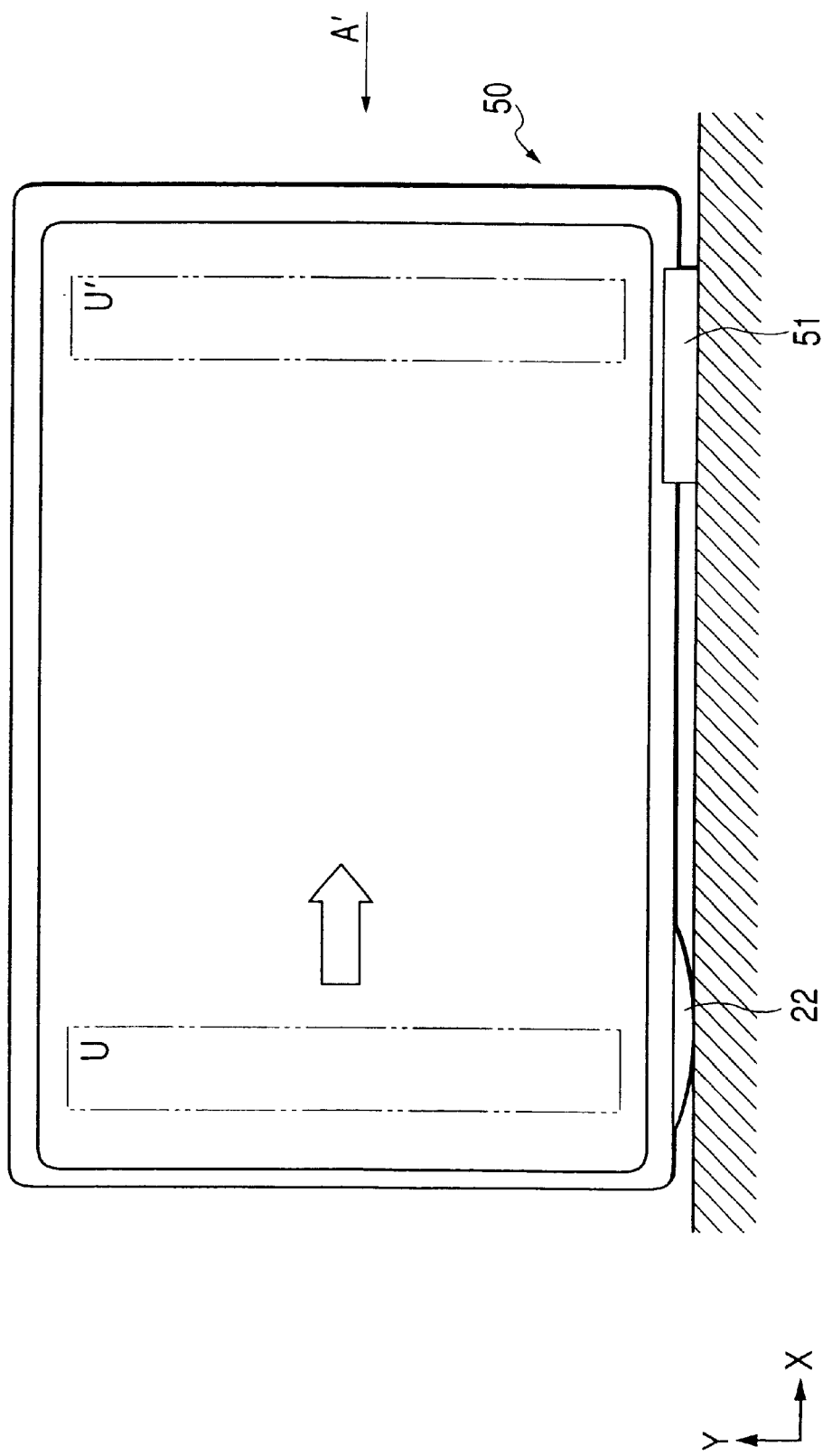
FIG. 7 is an illustration showing the image scanner when vertically placed.
Figure 8:
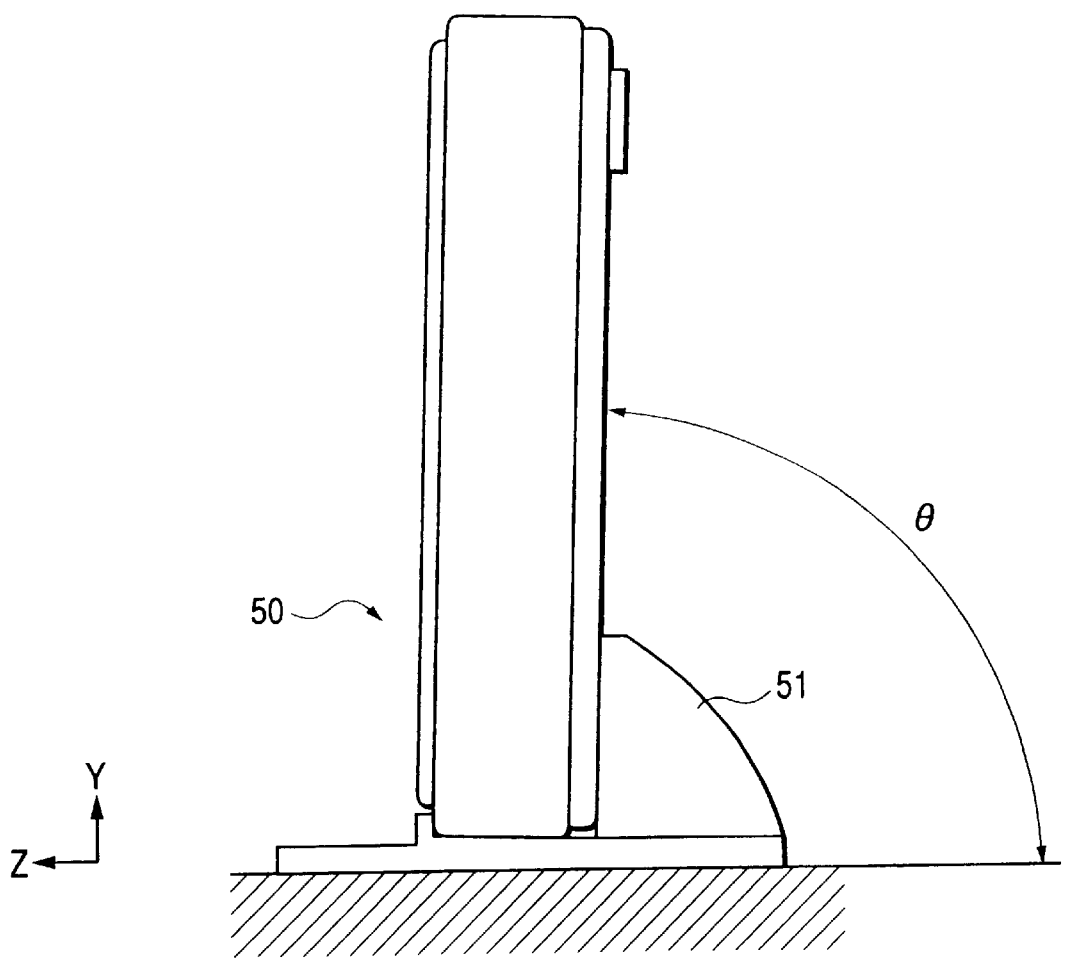
FIG. 8 is an illustration showing the image scanner when vertically placed.
Figure 9A:
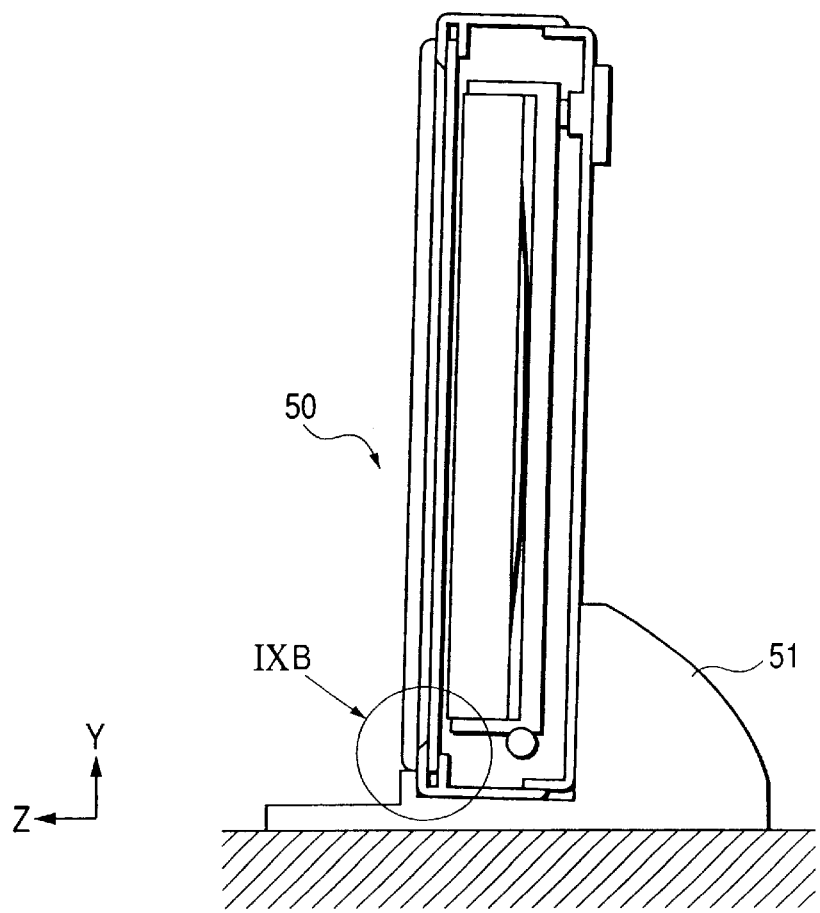
FIGS. 9A and 9B are illustrations showing the image scanner according to the prior art when vertically placed.
Figure 9B:
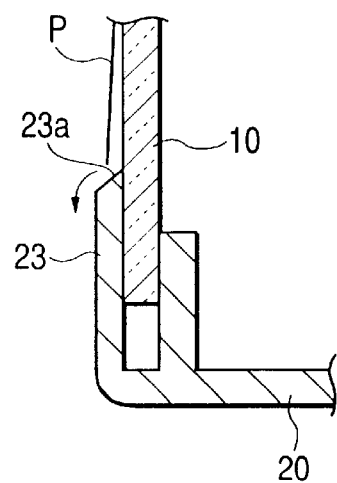

The present embodiment will hereinafter be described with reference to FIGS. 1A and 1B. FIGS. 1A and 1B are schematic views of Y-Z cross-section showing in detail the original supporting surface of the vertically placed image scanner 50 on which a sheet original P is placed. The image scanner 50 is in its vertically placed state as in FIGS. 6 and 7 showing the prior art.

In FIGS. 1A and 1B, an edge portion 23 as an abutting portion is shown on an upper cover 20 positioned on an original glass table 10 when horizontally placed. An abutting surface 23a on which this edge portion 23 abuts against the lower end portion of the sheet original P when the original glass table is vertically placed is formed with a tapered surface as a positioning portion in such a direction (Z direction) that the sheet original P does not float up from the original glass table 10, but goes toward the original glass table 10 side. That is, that side of the abutting surface 23a which is adjacent to the original glass table 10 when vertically placed is adapted to be inclined downwardly.

Thereby, when the original glass table is vertically placed, the lower end portion of the sheet original P goes toward the original glass table 10 side on the abutting surface 23a by the deadweight of the sheet original P and therefore, it becomes possible to position the sheet original P along the original glass table 10, and the sheet original P becomes equal to a state in which the sheet original P is placed on the original glass table 10 when horizontally placed.

Accordingly, even when the image scanner 50 is vertically placed, the sheet original P does not float up from the original glass table 10, but the sheet original P is stably held, and the image reading when the image scanner is vertically placed becomes readily possible.

Here, by adopting a construction in which an abutting surface against which not the lower end portion of the sheet original P, but the lateral side end portion of the sheet original P when the image scanner is vertically placed abuts is made into a similar tapered surface, the sheet original P may be prevented from being turned up.

Also, as shown in FIG. 1B, a convex portion 24 is provided on the side opposite to the abutting surface 23a of the edge portion 23 of the upper cover 20 with the original glass table 10 and the sheet original P interposed therebetween and the positioning portion is constructed with the abutting surface 23a made into an overhanging shape, the sheet original P can be positioned and an effect similar to that described above can be obtained.

Figure 2A:
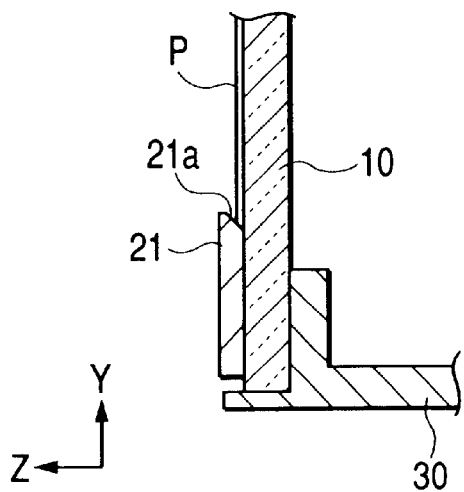
FIGS. 2A and 2B are partial cross-sectional views showing the edge portion of another original glass table when vertically placed according to an embodiment of the present invention.

On the other hand, as shown in FIG. 2A, even in an image scanner of a type in which the original glass table 10 is placed on the bottom cover 30, the abutting surface 21a of an abutting member 21 stuck on the original glass table 10 is provided on a tapered surface in such a direction (Z direction) that the sheet original P goes toward the original glass table 10, whereby the sheet original P can be disposed along the original glass table 10.

Figure 2B:
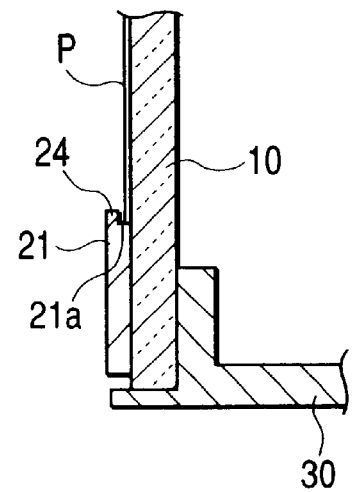
Figure 3:
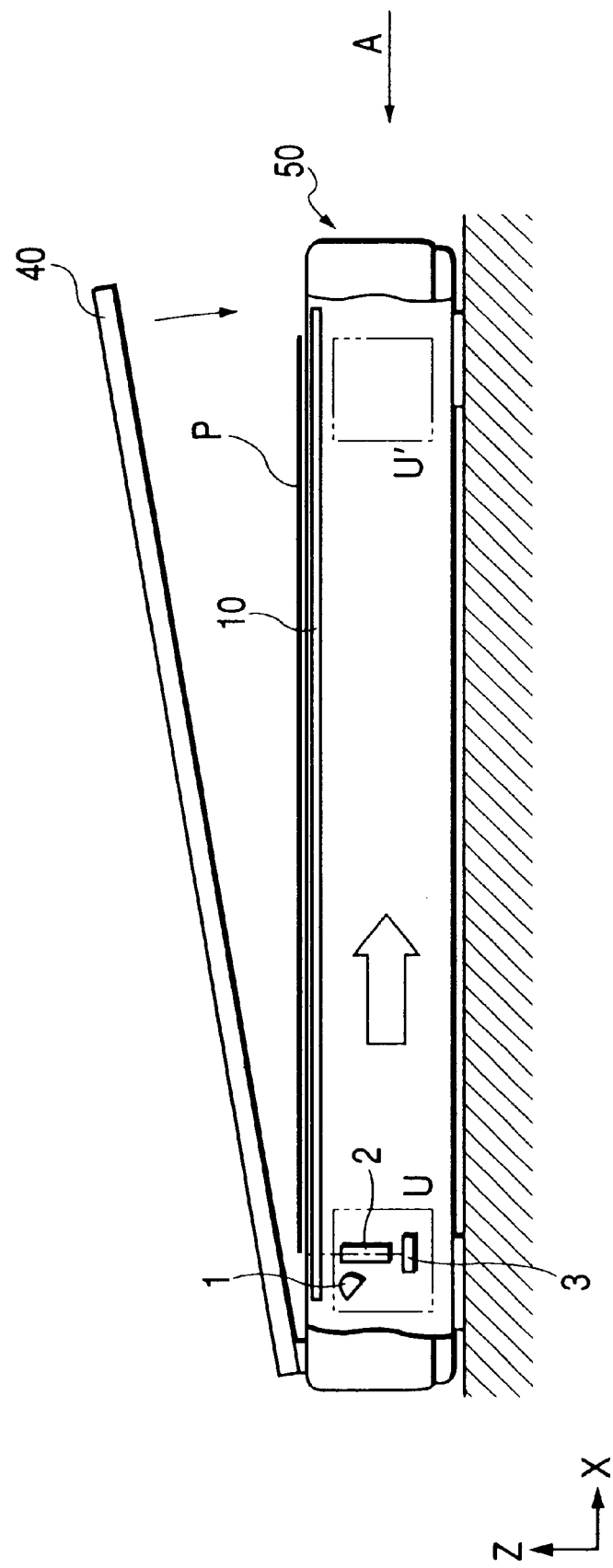
FIG. 3 is an illustration showing an image scanner.
Figure 4:
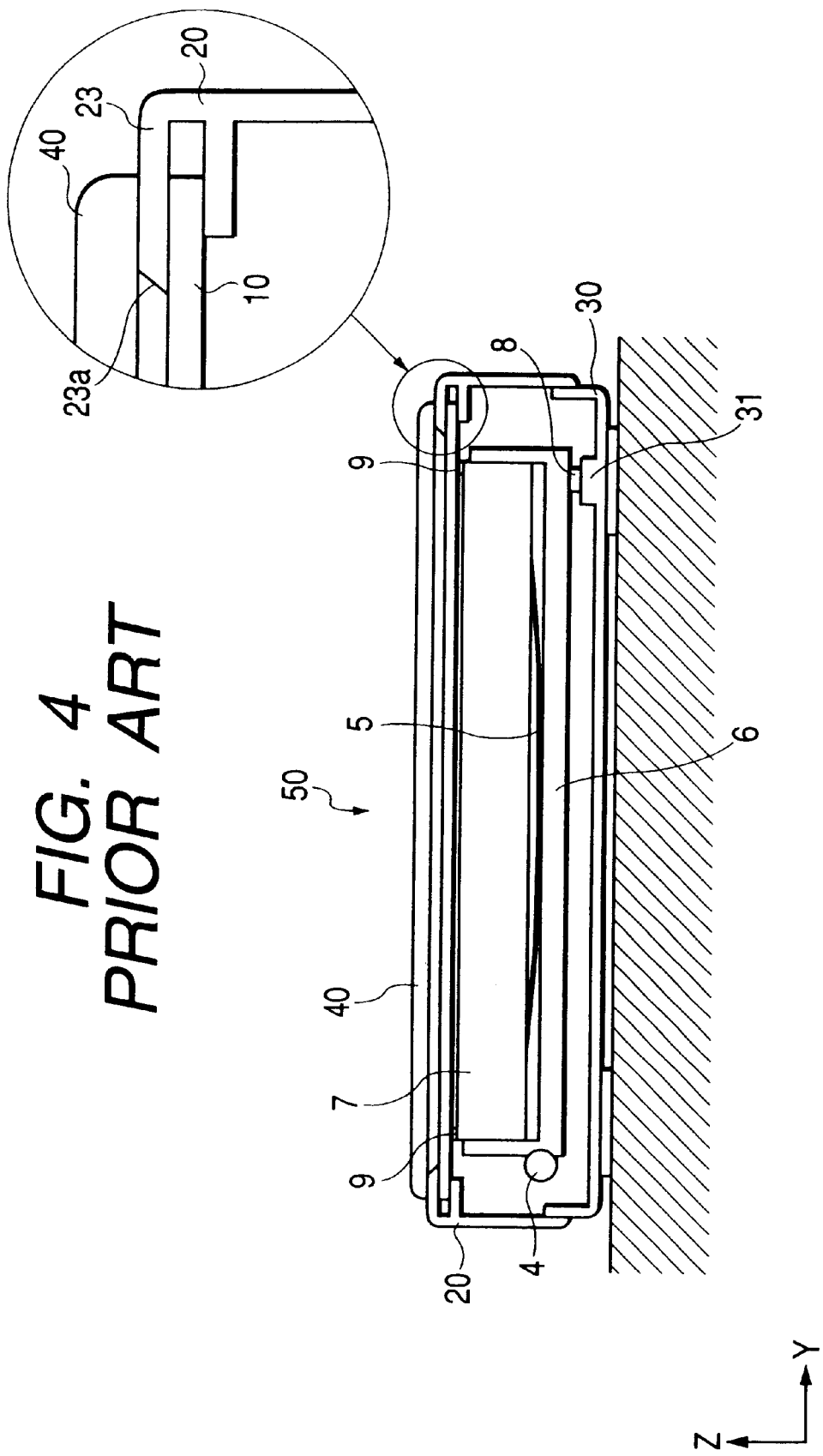
FIG. 4 schematically shows the construction of an image scanner according to the prior art.
Figure 5:
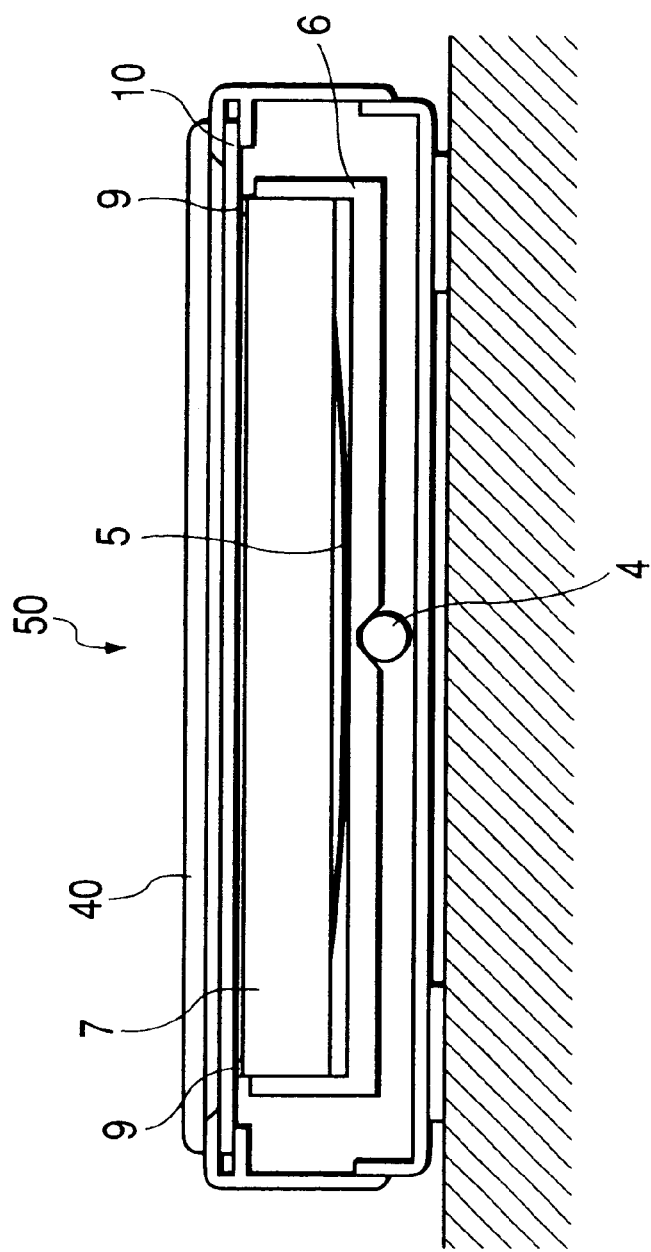
FIG. 5 schematically shows the construction of an image scanner according to the prior art.

Also, as shown in FIG. 2B, a convex portion 24 is provided on the abutting surface 21a and the abutting surface 21a is made into an overhanging shape, a similar effect can be obtained.

While the above embodiment has been described with respect to the image scanner 50, it can be an ordinary image reading apparatus having a unitary optical system using an image sensor such as a contact sensor as image reading means, and may also be applied to an image forming apparatus such as a copier or a facsimile apparatus provided with such an image reading apparatus.

What is claimed is:

1. An image reading apparatus comprising:

an original supporting surface on which a sheet original is placed;

a reading unit for reading an image of the sheet original placed on said original supporting surface; and an abutting portion which is provided on said original supporting surface and which has an abutting surface against which an end portion of the sheet original can abut;

wherein a positioning portion, which is a convex portion is formed on said abutting portion and a side of the abutting surface adjacent to said original supporting surface when vertically placed is lower compared to the other side, and wherein the end portion of the sheet orginal may not float up relative to said original supporting surface when said original supporting surface is brought into an inclined state with respect to a horizontal.

2. An image reading apparatus of claim 1, wherein said abutting portion includes a member stuck on said original supporting surface.

3. An image reading apparatus of claim 1, wherein said positioning portion is a tapered surface formed on said abutting portion so that a side of the abutting surface adjacent to said original supporting surface side when vertically placed is inclined downwardly.

4. An image forming apparatus provided with:

said image reading apparatus of claim 1, 2, or 3; and an image forming unit for forming the image read by said image reading apparatus on a sheet.

5. An image reading apparatus comprising:

an original supporting surface on which a sheet original is placed;

a reading unit for reading an image of the sheet original placed on said original supporting surface; and an abutting portion against which an end portion of the sheet original placed on said original supporting surface can abut;

wherein a positioning portion includes a convex portion provided along said original supporting surface, said convex portion is formed on an abutting surface at a place separated from said original supporting surface in said abutting portion, and wherein the end portion of the sheet original placed on said original supporting surface may not slip down when said original supporting surface is brought into an inclined state with respect to a horizontal.

6. An image reading apparatus of claim 5, wherein said abutting portion has a member stuck on said original supporting surface.

7. An image reading apparatus of claim 5, wherein said positioning portion is a tapered surface formed on said abutting portion and inclined so that the sheet original may go toward said original supporting surface side when placed inclined.

8. An image forming apparatus provided with:

said image reading apparatus of claim 5, 6, or 7; and an image forming unit for forming the image read by said image reading apparatus on a sheet.

9. An image reading apparatus comprising:

an original supporting surface on which a sheet original is placed in a horizontally placed state of a main body of said apparatus;

an image reading unit for reading an image of the sheet original placed on said original supporting surface; and an abutting member against which an end portion of the sheet original abuts and which is formed with a convex portion positioned on an abutting surface so that when the main body of said apparatus is placed inclined, the sheet may be held relative to said original supporting surface.

10. An image reading apparatus of claim 9, wherein said abutting member is stuck on said original supporting surface.

11. An image reading apparatus of claim 9, wherein said abutting member is formed with a tapered surface inclined so that the sheet original may go toward said original supporting surface side when the main body of said apparatus is placed inclined.

12. An image forming apparatus provided with:

the image reading apparatus of claim 9, 10, or 11; and image forming unit for forming the image read by said image reading apparatus on a sheet.

13. An image reading apparatus comprising:

an original supporting surface on which a sheet original is placed;

a reading unit for reading an image of the sheet original placed on said original supporting surface; and an abutting portion against which an end portion of the sheet original placed on said original supporting surface can abut;

wherein a positioning portion is a tapered surface formed on said abutting portion and inclined so that the sheet original may go toward said original supporting surface side when placed inclined; and wherein the end portion of the sheet original placed on said original supporting surface may not slip down when said original supporting surface is brought into an inclined state with respect to a horizontal.

* * * * *